Aug. 4, 1942.    I. W. HIRSHFIELD    2,292,272
PLANT LABEL
Filed June 26, 1940
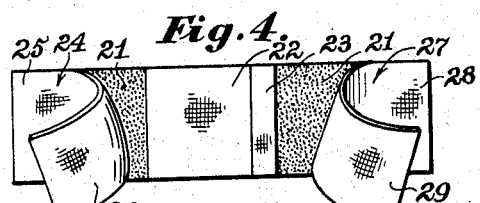
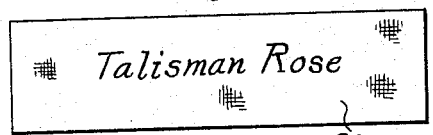
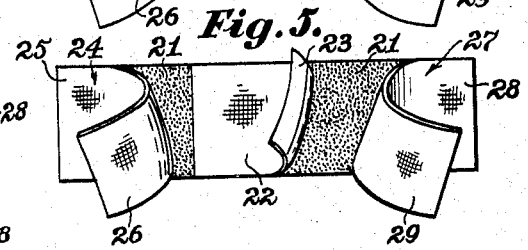
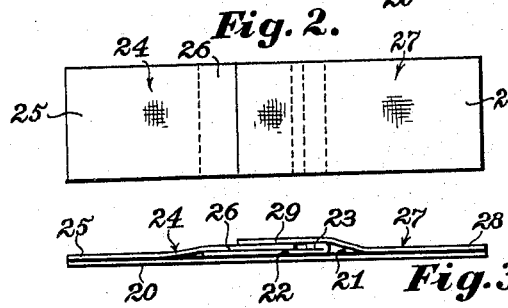
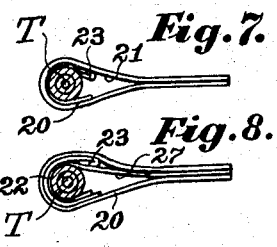
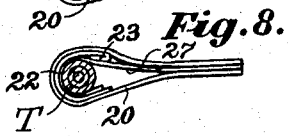
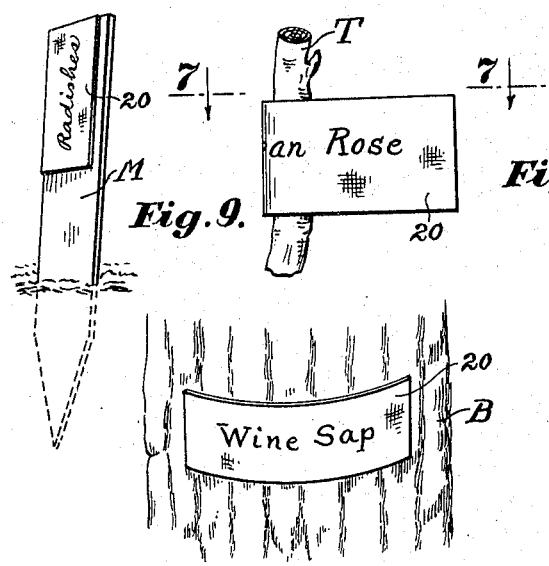
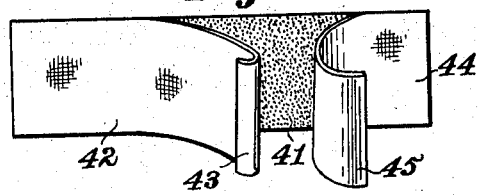
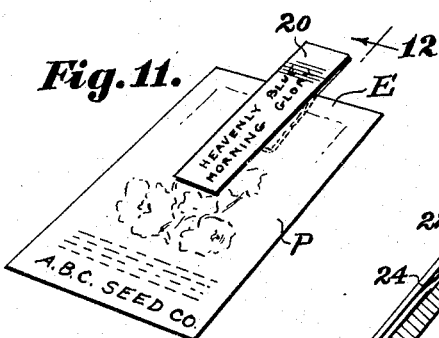
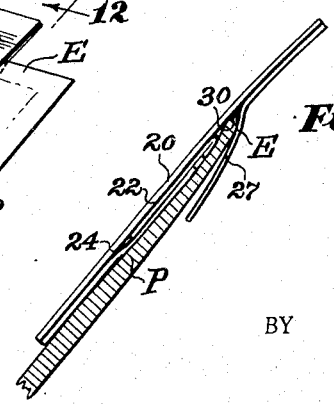
INVENTOR.
Ira W. Hirshfield.
BY
ATTORNEYS.

Patented Aug. 4, 1942

2,292,272

UNITED STATES PATENT OFFICE 2,292,272

PLANT LABEL

Ira W. Hirshfield, New York, N. Y.

Application June 26, 1940, Serial No. 342,463

1 Claim. (Cl. 40—2)

This invention relates to plant labels or the like. More particularly it relates to plant labels adapted for attachment to plants, to packages containing plants or seeds, or to markers used in connection with plants.

While I have described my invention in its application to plants, it will be understood that as to certain phases thereof it may have other applications.

Plant labels at present in use have many disadvantages, among which may be mentioned high cost, inconvenience in application, limited application, injury to plants and other articles to which the label is applied, bulk and lack of durability.

Among the objects of my invention is therefore the provision in a plant label of a construction that is simple, inexpensive, easy of application and durable, and is adapted to a variety of uses and will not injure plants or other objects to which it is attached.

Among other objects of my invention is the provision in a plant label of pliability, softness and small bulk.

These objects and such other objects as will hereinafter appear or be pointed out, are attained in the illustrative embodiments of my invention shown in the drawing, in which—

Figure 1 is a top plan view of one form of my improved plant label;

Figure 2 is a bottom plan view thereof;

Figure 3 is a side elevational view thereof;

Figures 4 and 5 are bottom plan views thereof, showing portions displaced from the positions in which they are shown in Figures 2 and 3;

Figure 6 is a view showing one use for the label of Figure 1;

Figure 7 is a sectional view substantially on the line 7—7 of Figure 6;

Figure 8 is a view similar to Figure 7 showing an alternative way of applying the label;

Figures 9 and 10 are views showing other uses of my label;

Figure 11 is a perspective view showing the label of Figure 1 applied to a package of seeds;

Figure 12 is a sectional view substantially on the line 12 of Figure 11, looking in the direction of the arrows;

Figure 13 is a side elevational view of a second embodiment of my invention;

Figure 14 is a bottom plan view of the label of Figure 13 with parts thereof displaced from their positions as shown in Figure 13; and Figure 15 is a view similar to Figures 7 and 8, showing the application of the embodiment of Figure 13 in a manner similar to that shown in Figures 6, 7 and 8 for the first embodiment of my invention.

Before proceeding to a detailed description of the embodiments of my improved label, I will refer to Figures 11 and 12, which show a label attached to a package of seeds. This label may be removed from the package, and after seeds from the package have sprouted the label may be applied to one of the sprouted plants, as indicated in Figures 6, 7 and 8 or may be applied to other plants.

The embodiment of my invention shown in Figures 1, 2 and 3 comprises a strip or layer 20 over one face of which is spread a coating 21 of non-drying adhesive, over the midportion of which is applied a short tab 22 having a flap 23 doubled back over the tab, this tab being held in place by the adhesive 21. A second tab 24 has one end 25 thereof applied over the adhesive layer 21, while its other end 26 overlies the tab 22. A third tab 27 has one end 28 thereof applied over the adhesive 21, while its other end 29 is shown overlying the flap 23 of the tab 22 and the end 26 of tab 24.

As will be readily understood the free or flap portions 23, 26 and 29 of the tabs 22, 24 and 27, respectively, are for the purpose of enabling ready removal or other manipulation of the tabs for purposes to be explained hereinafter. Such manipulation would be a troublesome matter where all portions of the tabs are held down by the adhesive. By leaving a flap portion free, this portion may be readily grasped by the fingers and the tab may then be readily peeled off or otherwise manipulated.

It will be understood that the flap portions need not be of the form or dimensions indicated, but may have any form or size consistent with their purpose. In particular, the flap portions 26 and 29 of tabs 24 and 27 may be much shorter than shown.

The strip 20 is preferably made of flexible material with one surface smooth enough and of a character to receive markings thereon, so that the name of the plant may be applied thereto by the gardener by ordinary means at his disposal. The material is further preferably water and weather resistant so that it will not be readily affected by the weather, I have found oil-cloth suitable in practice. It will resist the effects of the weather, and markings on its smooth side, if a suitable marking medium is used, will be visible for as long a time as ordinary gardening uses require. The adhesive of course is applied to its reverse side.

The adhesive 21, as already stated, is of the non-drying type, and preferably should be capable of retaining this property even when exposed to the weather for a considerable time. Such an adhesive will yield gradually as conditions, such as plant growth, require, but will remain adhesive and will not give suddenly so as to destroy its function of holding the label in place. Adhesives suitable for the purposes of my invention are well known. As an instance I may refer to the adhesive used in what is known in the trade as "adhesive tape."

While the adhesive 21 has been shown as distributed over the entire strip, it will be understood that it may be confined to portions thereof, its distribution being dependent on its function of holding the tabs in place and attaching the label to plants and other objects, as will appear hereinafter. Where it is applied only in spots, the flaps on the tabs may be disposed somewhat differently. For instance, the flap 23 need not be doubled over because the space underneath it may be left free of adhesive.

The tabs 22, 24 and 27 may be made of any light flexible material that will cover the adhesive without absorbing it or causing it to deteriorate. I have found coarse muslin to be very satisfactory.

One manner of using the label just described is shown in Figures 6 and 7. It consists in removing the tabs 24 and 27 from the strip 20 as indicated in Figure 4. This is conveniently done by first grasping the flap 29 with the fingers of one hand and peeling off the tab 27, while holding the left hand portion (25, etc.) of the label with the other hand, next holding the label at the portion 23 and grasping the flap 26 with the fingers of the free hand and peeling off the tab 24.

The label is now doubled over a twig such as shown at T in Figures 6 and 7 with the tab 22 on the inside, so that it protects the twig T from contact with the adhesive. The ends of the strip 20 are next pressed together as shown in Figure 7, and being coated with adhesive, they will adhere together.

It will now be observed that the label has been applied in such a manner that the twig T is protected from injury, and is free to expand as it grows with practically no resistance offered to such growth by the label, as would be the case where a label is attached by wire twisted about the twig, even if the twisting it not tight. My improved label readily accommodates itself to growth of the twig by gradual separation of the ends of the strip 20, which are only held together by the adhesive 21. As has already been mentioned the tab 22 protects the twig T from contact with the adhesive.

In Figure 8 I have shown a similar use of the label. However, in this figure, it will be observed that only the tab 24 has been removed. The tab 27 remains in place. The adhesive exposed by the removal of the tab 24, however, suffices to cause the end of strip 20 to adhere to the tab 27, which in turn adheres to the strip 20, so that the same result is achieved.

As the label is soft and pliable it accommodates itself readily to all contours of the article to which it is applied.

In Figure 9 I have shown the use of my improved label on a marker M in the form of a slat of wood or the like, such as is stuck into the ground to indicate the kind of seed that has been planted. For this purpose all of the tabs 22, 24 and 27 may be removed, completely exposing the adhesive 21, and the strip 20, appropriately marked, is attached to the flat surface of the slat M by pressing the adhesive 21 thereagainst.

In Figure 10 I have shown the strip 20, freed from all the tabs, applied to the bark of a tree. The soft, pliable strip 20 readily accommodates itself to all the contours of the tree and the adhesive coating 21, by which the label is held in place, readily yields and offers practically no resistance to the growth and expansion of the tree.

When my improved label is attached to a seed package, as shown in Figures 11 and 12, the tab 27 is stripped off sufficiently to expose a small portion 30 of the adhesive 21. A seed package P has its edge portion E inserted between the tab 27 and the tab 24 so that it contacts the adhesive portion 30. The strip 20, properly marked with the contents of the seed package appears on the face of the package. In this manner the package is marked to indicate its contents, and the purchaser receives a label that he can use in his garden.

Because of the small bulk of my label it can also be conveniently enclosed in packages of seeds and presents an extra inducement to the purchaser.

In Figures 13 and 14 I have shown a second embodiment of my invention. In this embodiment a strip 40, corresponding to the strip 20 of the first embodiment has a coat of adhesive 41 applied to one surface thereof. A tab 42 is superposed on the adhesive 41 and extends from one end of the strip 40 to its midportion. Its inner end has a doubled-over flap 43 so disposed that it does not touch the adhesive, and consequently can be readily grasped by the fingers when the tab is to be removed.

A second tab 44 overlies the adhesive on the other end of the strip 40 and has an end 45 overlying the flap 43 of the tab 42. This end being free of adhesive is readily grasped by the fingers, when the tab is to be removed.

In Figure 15 the use of this second embodiment of my invention on a twig U is illustrated, the view being similar to that of Figure 7. It will be observed that the tab 44 has been removed, and the label has been doubled about the twig U with the tab 42 protecting the twig from contact with the adhesive 41. The end portions are held together by the adhesive 41 that is exposed when the tab 42 is removed, this adhesive sticking to the outer face of the tab 42.

While I have herein disclosed several embodiments of my invention and described the manner of its use, it will be understood that my invention may be embodied in many other forms without departing from the spirit thereof, as will be obvious to those skilled in the art, and it will further be understood that the disclosure herein is by way of illustration merely and is not to be interpreted in a limiting sense, and that I do not limit myself other than as called for by the prior art.

Having thus described my invention and illustrated its use, what I claim as new and desire to secure by Letters Patent is:

A plant label comprising a sheet of flexible water resistant material adapted for marking on one face thereof the name of a plant and having a coating of non-drying waterproof adhesive on its other face, a tab of flexible sheet material superimposed on the midportion of said adhesive coated face, said tab having an extension thereon normally lying in doubled over relation to a relatively small portion of the outside face of the tab, whereby it is maintained out of contact with the adhesive, and a pair of tabs of a single ply of flexible sheet material, one overlying each end of said sheet and each of said last named tabs having an extension adapted to overlie said first tab, and to overlap the extension of the other of said last mentioned tabs, whereby it will be maintained out of contact with said adhesive.

IRA W. HIRSHFIELD.